(12) United States Patent
Dunning et al.

(10) Patent No.: US 10,946,328 B2
(45) Date of Patent: Mar. 16, 2021

(54) CENTRAL TYRE INFLATION SYSTEM AND METHOD

(71) Applicant: JAGUAR LAND ROVER LIMITED, Coventry (GB)

(72) Inventors: Emma-Claire Dunning, Coventry (GB); Paul King, Loughborough (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 456 days.

(21) Appl. No.: 15/745,657

(22) PCT Filed: Jul. 14, 2016

(86) PCT No.: PCT/EP2016/066757
§ 371 (c)(1),
(2) Date: Jan. 17, 2018

(87) PCT Pub. No.: WO2017/012974
PCT Pub. Date: Jan. 26, 2017

(65) Prior Publication Data
US 2018/0207575 A1 Jul. 26, 2018

(30) Foreign Application Priority Data
Jul. 17, 2015 (GB) ..................... 1512495

(51) Int. Cl.
*B01D 53/04* (2006.01)
*B60C 23/00* (2006.01)
*B01D 53/26* (2006.01)

(52) U.S. Cl.
CPC ....... *B01D 53/0454* (2013.01); *B01D 53/261* (2013.01); *B60C 23/003* (2013.01); *B01D 2257/80* (2013.01); *B01D 2259/40086* (2013.01)

(58) Field of Classification Search
None
See application file for complete search history.

(56) References Cited

U.S. PATENT DOCUMENTS

| 4,685,941 A | 8/1987 | Sato |
| 4,812,148 A | 3/1989 | Hata et al. |

(Continued)

FOREIGN PATENT DOCUMENTS

| DE | 102009003472 A1 | 8/2010 |
| DE | 102012106549 A1 | 5/2014 |
| GB | 2526305 A | 11/2015 |

OTHER PUBLICATIONS

Combined Search and Examination Report for application No. GB1512495.1, dated Jan. 12, 2016, 5 pages.

(Continued)

*Primary Examiner* — Christopher P Jones
*Assistant Examiner* — Phillip Y Shao
(74) *Attorney, Agent, or Firm* — Reising Ethington P.C.

(57) ABSTRACT

A central tire inflation system (CTIS) for a vehicle includes a reservoir for supplying air to the vehicle tires, a pressure sensor for monitoring air pressure in the reservoir, a compressor for supplying compressed air along a first flow path to the reservoir, a compressor timer for monitoring the run-time of the compressor, a dryer disposed on the first flow path for drying air supplied by the compressor, a purging system for routing air through the dryer along a second flow path to purge liquid from the dryer, and a controller for controlling the flow of air in the CTIS. The controller is configured: to activate the compressor in response to a request for a compressor operation, after which operation the air in the reservoir is at a post-operation pressure; when the compressor operation is complete, to determine a compressor activation period, and to determine if the compressor activation period is greater than or equal to a target period;

(Continued)

and if the compressor activation period is less than the target period, to keep the compressor activated until pressure in the reservoir increases to a base target pressure greater than the post-operation pressure; and if the compressor activation period is greater than or equal to the target period, to keep the compressor activated until pressure in the reservoir increases to an elevated target pressure higher than the base target pressure and to activate the purging system to route air from the reservoir to purge the dryer of liquid.

20 Claims, 2 Drawing Sheets

(56) References Cited

U.S. PATENT DOCUMENTS 5,917,139 A 6/1999 Goodell et al.
8,448,951 B2 5/2013 Hein

OTHER PUBLICATIONS

International Search Report for International application No. PCT/EP2016/066757, dated Oct. 11, 2016, 5 pages.
Written Opinion for International application No. PCT/EP2016/066757, dated Oct. 11, 2016, 4 pages.

CENTRAL TYRE INFLATION SYSTEM AND METHOD

TECHNICAL FIELD

The present disclosure relates to a central tire inflation system (CTIS) having a dryer purging system. Aspects of the invention relate to a CTIS, to a vehicle incorporating the CTIS, and to a method of purging a dryer in a CTIS.

BACKGROUND

Central tire inflation systems (CTISs) were originally developed for military applications, in particular for military applications concerning off-road military wheeled trucks and trailers. However, CTISs are nowadays incorporated into non-military vehicles such as specialist construction equipment and some agricultural vehicles.

A CTIS typically comprises a compressor located on-board the vehicle that supplies compressed air to a reservoir connected to one or more tire supply lines. Various valves are provided in the CTIS to control flow of compressed air, which typically include latching valves. Tire pressure can therefore be adjusted by operating the CTIS.

It is desirable to avoid condensation in the flow passages of CTISs because condensed liquids, usually condensed water from the air flowing through the system, can compromise the life of the valves. Condensed fluids and can cause particularly bad damage if the fluid is allowed to freeze in the valves, since expansion of water on freezing can lead to blockages or damage and cracking or splitting of components. Furthermore ice formation within the valves can either cause them to freeze in their closed state (if they are normally closed) or expansion as water freezes may compromise the valve seal leading to a potential air leak.

To reduce condensation, an air dryer can be used. The dryer extracts water from the air, and the extracted water builds up in the dryer. However, the dryer must be purged by reverse-flowing air through the dryer at high pressure, and this purging action requires air from the CTIS. Removing air from the CTIS for the purposes of purging the dryer can lead to low air pressure in the reservoir, which can reduce the effectiveness of the CTIS, and in particular of any pneumatically-operated valves such as latching valves.

At least in certain embodiments, the present invention aims to solve, or at least mitigate, at least some problems that can be identified in the prior art, and/or to provide an improved CTIS compared to the prior art.

SUMMARY OF THE INVENTION

Aspects and embodiments of the invention provide CTIS for a vehicle; a method of purging a dryer in a CTIS of a vehicle; and a vehicle as claimed in the appended claims.

According to an aspect of the present invention there is provided a central tire inflation system (CTIS) for a vehicle, the CTIS comprising a reservoir for supplying air to one or more vehicle tires, a pressure sensor for monitoring air pressure in the reservoir, a compressor for supplying compressed air along a first flow path to the reservoir, a compressor timer for monitoring the run-time of the compressor, a dryer disposed on the first flow path for drying air supplied by the compressor, a purging system for routing air through the dryer along a second flow path to purge liquid from the dryer, and a control means for controlling the flow of air in the CTIS. The control means is configured: to activate the compressor to supply air along the first flow path to the reservoir in response to a request for a compressor operation, after which operation the air in the reservoir is at a post-operation pressure; when the compressor operation is complete, to determine a compressor activation period, and to determine if the compressor activation period is greater than or equal to a target period; and if the compressor activation period is less than the target period, to keep the compressor activated until pressure in the reservoir increases to a base target pressure greater than the post-operation pressure; and if the compressor activation period is greater than or equal to the target period, to keep the compressor activated until pressure in the reservoir increases to an elevated target pressure higher than the base target pressure and to activate the purging system to route air from the reservoir along the second flow path to purge the dryer of liquid. The CTIS operates a system in which a full purge of the drier is carried out only if the compressor activation period is greater than a target time period, and therefore only if a full purge is necessary. If the compressor activation period is less than the target time period, a full purge is not necessary, and only a partial purge is carried out. The system is therefore particularly efficient.

If the controller determines that a full purge is needed, the reservoir is refilled until the pressure in the reservoir reaches an elevated base pressure that exceeds the usual operating pressure of the reservoir. The reservoir is therefore provided with excess pressure that can be used to purge the drier without detriment to the operation of the CTIS. Because of this excess pressure in the reservoir, once the air has been routed through the drier and the purge cycle finished, the pressure in the reservoir is still sufficient to send the pneumatic signal to the latching valves in order to open or close the latching valves to effect future tire inflation during the next CTIS event.

Furthermore, keeping the compressor activated between the compressor event and the refill cycle means that deactivation and reactivation of the compressor is minimized, which would otherwise be detrimental to the life of the compressor.

The control means may comprise: an electronic processor having a first electrical input for receiving an electrical signal indicative of the value of the compressor activation period, a second electrical input for receiving an electrical signal indicative of the pressure in the reservoir, a first electronic output for controlling the compressor and a second electronic output for controlling the purging system; and an electronic memory device electrically coupled to the electronic processor and having instructions stored therein; wherein the processor is configured to access the memory device and execute the instructions stored therein.

The compressor activation period may be the time period for which the compressor has been active when the compressor operation is complete.

Alternatively, the compressor activation period may be the sum of the time period for which the compressor has been active when the compressor operation is complete, and an estimated time period for which the compressor would be active to refill the reservoir to the base target pressure.

The base target pressure may be between approximately 7 bar(g) and 8 bar(g). In particular, the base target pressure may be approximately 7.3 bar(g).

The elevated target pressure may be between approximately 8 bar(g) and 9 bar(g). In particular, the elevated target pressure may be approximately 8.3 bar(g).

The control means may be configured to activate the purging system to route air along the second flow path until the pressure in the reservoir reaches a post-purge target pressure.

The post-purge target pressure may be less than the base target pressure.

The post-purge target pressure may be between approximately 4 bar(g) and 6 bar(g). In particular, the post-purge target pressure may be approximately 5.3 bar(g).

The controller may be configured to reset the compressor timer after purging the dryer if the time period is greater than or equal to the target period.

The purging system may comprise a purge valve on the second flow path.

The CTIS may comprise a reservoir valve disposed on the first flow path between the reservoir and the dryer.

The controller may be configured to close the reservoir valve and open the purge valve after refilling the reservoir to the base target pressure, so as to vent pressure in the CTIS system through the dryer, if the time period is less than the target period.

The controller may be configured to activate the purging system by opening the purge valve while the reservoir valve is open.

The compressor operation may be the inflation of one or more tires or the refilling of the reservoir.

The target time period may be selected such that, in order to inflate four tires of the vehicle, the compressor must run for a time period that is greater than or equal to the target time period.

The target period and/or the base target pressure and/or the elevated target pressure can be modified to suit operating conditions of the CTIS.

According to another aspect of the present invention there is provided a method of purging a dryer in a central tire inflation system (CTIS) of a vehicle, the CTIS comprising a reservoir containing compressed air for supply to one or more vehicle tires, a compressor for supplying compressed air to the reservoir and a dryer for drying air supplied by the compressor, and the method comprising; activating the compressor such that air flows into the reservoir to effect a compressor operation, after which operation the air in the reservoir is at a post-operation pressure; after the compressor operation is complete, determining a compressor activation period; and in the case that the compressor activation period is less than a target period, refilling the reservoir with air until pressure in the reservoir increases to a base target pressure higher than the post-operation pressure; and in the case that the compressor activation period is greater than or equal to a target period, refilling the reservoir with air until the pressure in the reservoir reaches an elevated target pressure higher than the base target pressure, and routing air from the reservoir through the dryer to purge the dryer of liquid such that the pressure in the reservoir decreases from the elevated target pressure to a pressure lower than the elevated target pressure.

The compressor activation period may be the time period for which the compressor has been active when the compressor operation is complete.

Alternatively, the compressor activation period may be the sum of the time period for which the compressor has been active when the compressor operation is complete, and an estimated time period for which the compressor would be active to refill the reservoir to the base target pressure.

The base target pressure may be between approximately 7 bar(g) and 8 bar(g). In particular, the base target pressure may be approximately 7.3 bar(g).

The elevated target pressure may be between approximately 8 bar(g) and 9 bar(g). In particular, the elevated target pressure may be approximately 8.3 bar(g).

The method may comprise routing air along the second flow path until the pressure in the reservoir reaches a post-purge target pressure.

The post-purge target pressure may be less than the base target pressure.

The post-purge target pressure may be between approximately 4 bar(g) and 6 bar(g). In particular, the post-purge target pressure may be approximately 5.3 bar(g).

The method may comprise determining the time period for which the compressor has been active using a compressor timer, and in the case that the compressor activation period is greater than or equal to the target period, resetting the compressor timer after purging the dryer.

The CTIS may comprise a reservoir valve disposed between the reservoir and the dryer on a first flow path and a purge valve disposed between the reservoir and the dryer on a second flow path. In this case, the method may comprise routing air from the reservoir through the dryer by opening the purge valve while the reservoir valve is open.

If the time period is less than the target period, the method may comprise closing the reservoir valve and opening the purge valve after refilling the reservoir to the base target pressure, so as to vent pressure in the CTIS system through the dryer.

The compressor operation may be the inflation of one or more tires or the refilling of the reservoir.

The target time period may be selected such that, in order to inflate four tires of the vehicle, the compressor must run for a time period that is greater than or equal to the target time period.

The invention also extends to a CTIS configured to implement the method described above, and to a vehicle comprising the CTIS described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
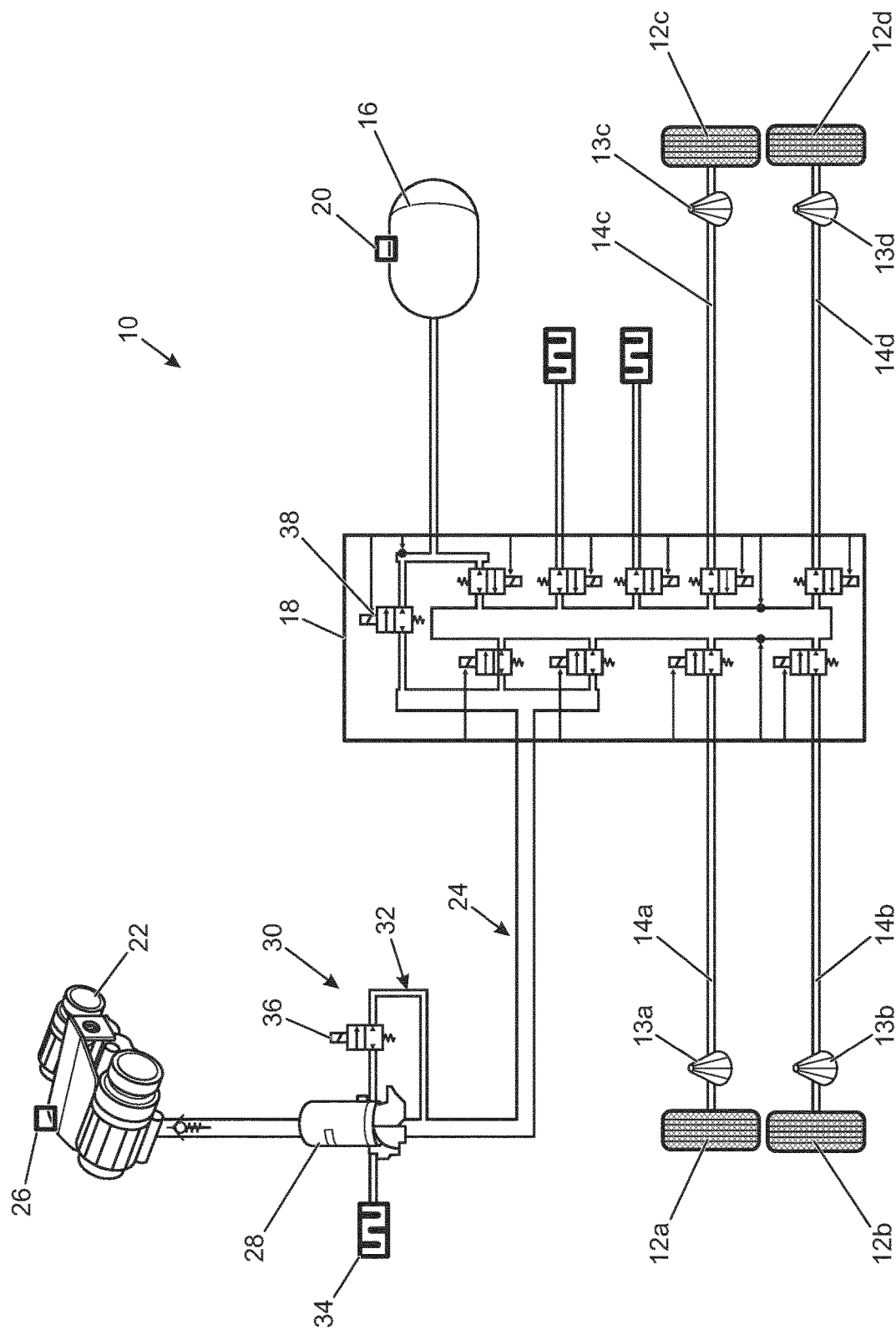
FIG. 1 is a schematic view of a CTIS according to an embodiment of the invention integrated into a vehicle.

FIG. 1 is a schematic view of a CTIS 10 incorporated into a vehicle. The vehicle comprises four tires 12a, 12b, 12c, 12d supplied by respective supply lines 14a, 14b, 14c, 14d. A latching valve 13a, 13b, 13c, 13d is associated with each tire, and in use can be opened or closed to permit or halt inflation of each tire individually.

The CTIS comprises a reservoir 16 that supplies a pneumatic signal comprising a pulse of compressed air to the latching valves 13a, 13b, 13c, 13d via the supply lines 14a, 14b, 14c, 14d. This pneumatic signal causes the latching valves to open and close as needed. A pressure monitor 20 monitors the pressure in the reservoir 16.

A compressor 22 supplies compressed air to the reservoir 16 along a first flow path 24, and to the tires 12a, 12b, 12c, 12d via the valve arrangement 18. The compressor 22 comprises a compressor timer 26 that monitors the time period for which the compressor 22 has been running.

Between the compressor 22 and the reservoir 16 is a dryer 28 that dries the air supplied by the compressor 22. The dryer includes a moisture-absorbing/adsorbing material such as a desiccant that absorbs moisture from the air as the air passes over the desiccant.

Moisture that is removed from the air as it dries congregates in the dryer 28. To remove the moisture in the dryer 28, the CTIS is provided with a purging system 30. The purging system 30 defines a second flow path 32 through the dryer 28 that ends in a vent 34. Air can be routed along the second flow 32 path at high pressure, and as it flows through the dryer 28 it draws moisture out through the vent to purge moisture from the dryer 28. A purge valve 36 controls the flow of air through the dryer 28 along the second flow path 32.

The CTIS 10 is controlled by a control means (not visible in FIG. 1) such as a programmable controller. In practice, the control means may be made up of a plurality of interconnected controllers. For example, the compressor 22 may comprise a compressor controller that includes the compressor timer 26, the reservoir 16 may comprise a reservoir controller that includes the pressure sensor 20, the valve arrangement 18 may be controlled by a further controller, and these controllers may be capable of communicating with one another, such that the controllers together constitute the control means.

In use, the CTIS 10 enacts compressor operations. The compressor operation may be for example, the inflation of a single tire 12a, 12b, 12c, 12d, the inflation of multiple tires 12a, 12b, 12c, 12d (in particular, inflation of all four tires 12a, 12b, 12c, 12d), or the refilling of the reservoir 16.

During the compressor operation, air flows from the compressor 22 to the reservoir 16 along the first flow path. Air leaving the compressor is dried by the dryer 28 before it reaches the reservoir 16. As the air is dried, moisture builds up in the dryer 28.

After the compressor operation, the control means initiates a refill cycle in which the reservoir 16 is topped up with air from the compressor 22. During this cycle the dryer 28 continues to dry air from the compressor 22.

After the refill cycle is complete, the control means initiates a purge cycle, during which air is routed along the second airflow path 32, through the dryer 28 and out of the vent 34 to carry moisture out of the dryer 28.

The control means is configured to initiate different refill and purge cycles depending on whether or not a compressor activation period $T_{compressor}$ is greater than or equal to a target time period $T_{target}$.

If the compressor activation period $T_{compressor}$ is less than the target time period $T_{Target}$ a comparatively small amount of moisture will have built up in the dryer 22, and a small purge cycle is sufficient. In this case, during the re-fill cycle the control means keeps the compressor 22 running until the pressure in the reservoir 16 reaches a pressure that is sufficient to send future pneumatic signals to the latching valves 13a, 13b, 13c, 13d in order to open or close the latching valves 13a, 13b, 13c, 13d to effect future tire inflation operations. The refill cycle is then stopped and a purge cycle is initiated.

To enact the purge cycle, the control means first isolates the reservoir from the dryer. Next, the control means opens the purge valve 36. On opening the purge valve 36, any excess air pressure in the flow passages is routed along the second flow path 32, through the dryer and out through the vent to purge moisture from the dryer. Since only air already in the flow passages is routed through the dryer 28, a comparatively small amount of air is routed through the dryer 28, and thus the purge is comparatively small. This comparatively small amount of air will be sufficient to remove any droplets of condensed water from the dryer.

If the compressor activation period $T_{compressor}$ is greater than the target time period $T_{Target}$, more moisture has built up in the dryer 28 and a more thorough purge cycle is needed to ensure that moisture is sufficiently well removed from the dryer 22. The reservoir 16 is therefore topped up to a pressure that is comparatively high, and in particular is higher than the pressure that would be required to effect future operations such as tire inflation. During the purge cycle, air is directed from the reservoir 16 through the purging system 30 to relieve the elevated pressure. Because air is taken from the reservoir 16, a comparatively large amount of air is directed through the dryer 28, for a longer time and at a higher pressure and/or flow rate to provide a more thorough purge. In particular, sufficient air is passed over the water absorbing/adsorbing material within the dryer, to substantially remove moisture from the material.

Figure 2:
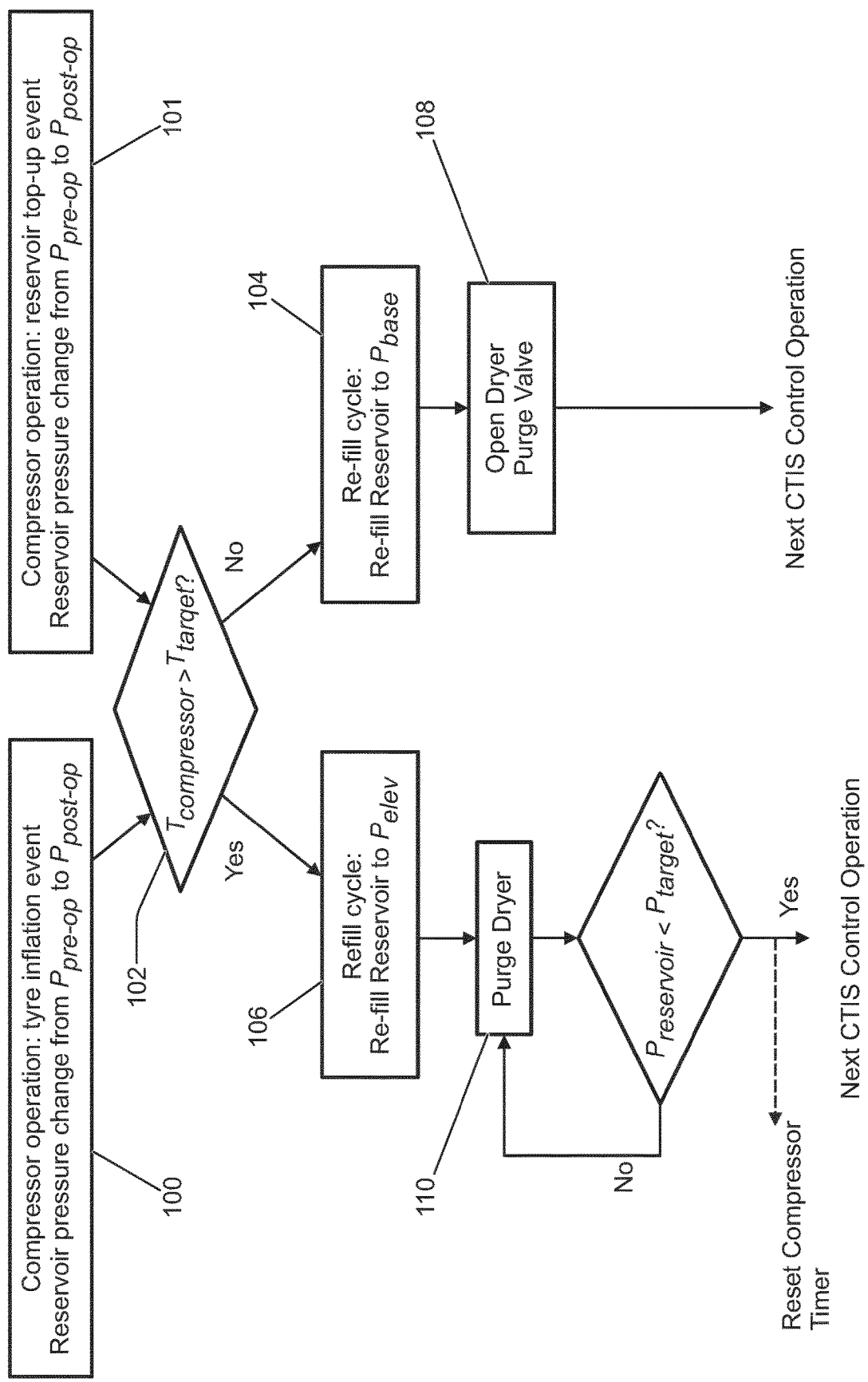
FIG. 2 is a flow diagram illustrating operation of the CTIS of FIG. 1 when inflating one or more tires of the vehicle.

FIG. 2 shows schematically the events during and after a compressor operation in more detail.

Before the compressor operation is initiated, the pressure in the reservoir 16 is at a pre-operation pressure $P_{pre-op}$. The value of the pre-operation pressure will depend on the preceding events, but is typically at least the minimum pressure required to robustly operate the latching valves 13a, 13b, 13c, 13d, but no greater than the maximum pressure permitted by the control means. In this example, the pre-operation pressure is typically between 5.3 bar(g) and 8.3 bar(g).

If the compressor operation is an inflation event 100 in which one or more tires 12a, 12b, 12c, 12d are inflated, the control means initiates the tire inflation event 100 by causing a pneumatic signal to be sent from the reservoir 16 to the latching valves 13a, 13b, 13c, 13d to open the latching valves 13a, 13b, 13c, 13d, and by activating the compressor 22 and controlling the valve arrangement 18 so as to open the flow path from the compressor to the required tire supply lines 14a, 14b, 14c, 14d to supply air to the required tires 12a, 12b, 12c, 12d. The compressor 22 remains activated as the tires 12a, 12b, 12c, 12d are inflated so as to supply a continuous flow of air. After the inflation is complete, the pressure in the reservoir 16 has changed from the pre-operation pressure $P_{pre-op}$ to a post-operation pressure $P_{post-op}$.

If the compressor operation is a reservoir top-up event 101 in which the reservoir 16 is refilled with air, the control means initiates the reservoir top-up event 101. The control means closes the latching valves 13a, 13b, 13c, 13d so as to block the tire supply lines 14a, 14b, 14c, 14d, and closes a reservoir valve 38 in the valve arrangement 18 so as to block air flow to the reservoir. The compressor 22 is then activated to pressurize the flow paths 24, 32 before the reservoir valve 38. Once pressure has built up in the flow paths, the reservoir valve 38 is opened so that air flows along the first flow path 24 to the reservoir 16 allowing pressure to build up. The pressure in the reservoir 16 changes from the pre-operation pressure $P_{pre\text{-}op}$ to a post-operation pressure $P_{post\text{-}op}$. Pre-pressurizing the flow paths 24, 32 before opening the reservoir valve 38 in this way allows the compressor to build up pressure gradually, thereby guarding against pneumatic shock introducing a risk of the compressor 22 stalling.

Following the compressor event 100, 101 the control means determines at stage 102 whether the compressor activation period $T_{compressor}$ is greater than or equal to a target time period $T_{target}$.

The compressor activation period $T_{compressor}$ may be calculated as the time period $T_{run}$ for which the compressor 22 has already been running when the compressor operation is completed, which is measured by the compressor timer 26.

Embodiments are also envisaged in which the compressor activation period $T_{compressor}$ is calculated as the sum of the time period $T_{run}$ for which the compressor 22 has already been running when the compressor operation is completed, and an estimated time period $T_{est}$ for which the compressor 22 would need to run in order to refill the reservoir 16 to the base target pressure $P_{base}$ (i.e. $T_{compressor}=T_{run}+T_{est}$). A typical estimated time period $T_{est}$ that would be necessary to refill the reservoir 16 to $P_{base}$ is approximately 10 s to 15 s.

In this case, if the compressor 22 would have been running for at least the target time period $T_{target}$ by the time the compressor operation is complete and the reservoir 16 has been re-filled up to at least the base target pressure $P_{base}$, the control means will initiate re-fill cycle 106 and the full purge cycle 110. If the compressor would have been running for less than the target time period $T_{target}$ by the time the compressor operation is complete and the reservoir 16 has been re-filled up to at least the base target pressure $P_{base}$, the control means will initiate re-fill cycle 104 and the purge cycle 108.

The target time period may be a pre-selected time period that may be chosen according to the operating conditions of the CTIS. For example, the target time period may be selected to be the minimum time period for which the compressor 22 can run before a full purge of the dryer 28 will be required. In this example, the target time period $T_{target}$ is 85 seconds, though any suitable target time period may be used. For example, the target time period may be selected such that the compressor 22 would need to run for a time period at least as great as the target time period in order to inflate all four tires of the vehicle. The target time period may be varied as required, for example by re-programming the control means, or the target time period may be determined each cycle by the control means according to particular operating parameters.

After the control means has determined whether the compressor activation period is greater than or equal to the target time period, the control means commences a refill cycle 104, 106 in which the reservoir 16 is refilled with compressed air.

To initiate the refill cycle 104, 106, the control means controls the valve arrangement 18 so as to block the tire supply lines 14a, 14b, 14c, 14d. The compressor 22 remains activated from the inflation cycle 100 so that air continues to flow along the first flow path 24 to the reservoir 16. As air continues to flow, the pressure in the reservoir 16 increases.

The compressor 22 is continuously activated during both the compressor operation 100, 101 and the refill cycle 104, 106. In this way, the compressor 22 does not need to be deactivated and reactivated in order to implement the refill cycle. This is particularly beneficial since it avoids wear of the compressor that would otherwise occur when the compressor is reactivated, thereby increasing the life of the compressor.

The refill cycle 104, 106 varies according to whether or not the compressor activation period is greater than or equal to the target time period.

If the compressor activation period is less than the target time period, the refill cycle is refill cycle 104 as indicated in FIG. 2 on the right-hand branch. In this case, the control means allows the compressor 22 to continue running until the pressure in the reservoir 16 $P_{reservoir}$ as measured by the pressure sensor 20 reaches a base target pressure $P_{base}$.

The base target pressure $P_{base}$ is selected to be a pressure that is sufficient to send future pneumatic signal to the latching valves 13a, 13b, 13c, 13d in order to open or close the latching valves 13a, 13b, 13c, 13d to effect future tire inflation. For example, the base target pressure $P_{base}$ may be selected to be a pressure that is sufficient to allow all four tires of the vehicle to be inflated. A suitable base target pressure $P_{base}$ is between 7 and 8 bar(g), and in this example is 7.3 bar(g).

Once the reservoir pressure $P_{reservoir}$ has reached the base target pressure $P_{base}$, the control means deactivates the compressor 22 and the refill cycle 104 is complete.

After the re-fill cycle 104 is complete the control means initiates a purge cycle 108. The control means controls the valve arrangement 18 so as to isolate the reservoir 16 from the compressor 22 and the dryer 28 by closing a reservoir valve 38 in the valve arrangement on the first flow path 24. The control means then opens the purge valve 36 to allow air to flow through the dryer 28 along the second flow path 32. Any excess pressure in the airways of the CTIS is routed through the second flow path 32, through the dryer 28 and out of the vent 34, taking moisture with it and thereby purging the dryer 28.

Once all the excess air in the flow passages has been routed through the dryer 28 the purge cycle 108 is complete, the control means closes the purge valve 36. The CTIS is then ready for the next CTIS control operation. The compressor timer 26 is kept running after the purge cycle 108 is complete, such that during the next compressor operation 100, 101, more time will accumulate on the compressor timer until eventually the compressor activation period exceeds the target time period $T_{target}$.

If the compressor activation period is greater than or equal to the target time period $T_{target}$, the refill cycle is refill cycle 106 as indicated in FIG. 2 on the left-hand branch. In this case, the control means allows the compressor 22 to continue running until the pressure in the reservoir 16 as measured by the pressure sensor 20 reaches an elevated target pressure $P_{elev}$ that is greater than the base target pressure $P_{base}$ by an overpressure $P_{over}$.

The elevated target pressure $P_{elev}$ is selected to be a pressure that is greater than the pressure that would be required to complete further CTIS operations. For example, the elevated target pressure may be selected to be a pressure that is greater than the pressure required to inflate all four tires of the car. A suitable elevated target pressure $P_{elev}$ is between 8 and 9 bar(g), and in this example is 8.3 bar(g), which provides an overpressure $P_{over}$ of approximately 1 bar(g).

Once the pressure in the reservoir has reached the elevated target pressure $P_{elev}$, the control means deactivates the compressor 28 and the refill cycle 106 is complete.

After the refill cycle 106 is complete, the control means initiates a purge cycle 110.

In this case, the reservoir 16 remains in communication with the dryer 28. The control means opens the purge valve 36, and the excess pressure in the reservoir flows through the dryer 28 along the second flow path 32 and out of the vent 34, taking moisture with it and thereby purging the dryer 28.

As the air flows out of the reservoir 16 to purge the dryer 28 the pressure in the reservoir $P_{reservoir}$ decreases, and the control means monitors the decreasing pressure by means of the pressure sensor 20. The control means allows the purging cycle to continue until the pressure in the reservoir $P_{reservoir}$ reaches a pre-selected post-purge target pressure $P_{target}$.

The post-purge target pressure $P_{target}$ is selected such that once the post-purge target pressure $P_{target}$ has been reached, the dryer 28 has been purged sufficiently to ensure effectiveness of the dryer 28 for the next and future CTIS operations. The post-purge target pressure $P_{target}$ may be varied according to the operating conditions of the CTIS, such as the environmental conditions. For example, in regions of high humidity, a longer purge cycle may be required, and hence a lower target pressure $P_{target}$ may be selected. A suitable post-purge target pressure $P_{target}$ may be between 4 and 6 bar(g), and in this example is 5.3 bar(g).

Continuing the purge cycle until a post-purge target pressure $P_{target}$ has been reached means that a critical volume of air is reliably routed through the drier 28 to ensure thorough purging of the drier each time the drier is purged. This gives a more reliable purge than would be provided by, for example, continuing the purge cycle for a pre-selected period of time, resulting in a more reliable CTIS.

Once the post-purge target pressure $P_{target}$ has been reached, a final venting step is carried out. The reservoir valve 38 is closed and any excess pressure remaining in the flow passages 24, 32 is vented out through the vent 34 via the dryer 36. The final venting step effectively extends the purge cycle, and also reduces the pressure in the flow passages 24, 32 ready for the next compressor operation. When the final venting step is complete the control means ends the purge cycle 110 by closing the purge valve 36. When the purge cycle 110 has ended, the control means resets the compressor timer 26, and the CTIS is ready for the next CTIS control operation.

The CTIS therefore operates a system in which a full purge of the drier 28 is carried out only if the compressor activation period is greater than a target time period, and therefore only if a full purge is necessary. If the compressor activation period is less than the target time period, a full purge is not necessary, and only a partial purge is carried out. The system is therefore particularly efficient.

If the controller determines that a full purge is needed, the reservoir 16 is refilled until the pressure in the reservoir 16 reaches an elevated base pressure that exceeds the usual operating pressure of the reservoir 16. The reservoir is therefore provided with excess pressure that can be used to purge the drier 28 without detriment to the operation of the CTIS. Because of this excess pressure in the reservoir, once the air has been routed through the drier and the purge cycle finished, the pressure in the reservoir is still sufficient to send the pneumatic signal to the latching valves 13a, 13b, 13c, 13d in order to open or close the latching valves 13a, 13b, 13c, 13d to effect future tire inflation during the next CTIS event.

The target time period, base target pressure, elevated target pressure and post-purge target pressure may all be varied according to the operating conditions of the CTIS. The target time period, base target pressure, elevated target pressure and post-purge target pressure may all be altered during the life of the CTIS, for example by re-programming the control means.

It will be appreciated by a person skilled in the art that the invention could be modified to take many alternative forms without departing from the scope of the appended claims.

The invention claimed is:

1. A central tire inflation system (CTIS) for a vehicle, the CTIS comprising a reservoir for supplying air to one or more vehicle tires, a pressure sensor for monitoring air pressure in the reservoir, a compressor for supplying compressed air along a first flow path to the reservoir, a compressor timer for monitoring a run-time of the compressor, a dryer disposed on the first flow path for drying air supplied by the compressor, a purge valve for routing air through the dryer along a second flow path to purge liquid from the dryer, and a controller for controlling the flow of air in the CTIS; wherein the controller is configured:
to activate the compressor to supply air along the first flow path to the reservoir in response to a request for a compressor operation, after which operation the air in the reservoir is at a post-operation pressure;
when the compressor operation is complete, to determine a compressor activation period in dependence on a measurement by the compressor timer, and to determine if the compressor activation period is greater than or equal to a target period; and
if the compressor activation period is less than the target period, to keep the compressor activated until pressure in the reservoir increases to a base target pressure greater than the post-operation pressure; and
if the compressor activation period is greater than or equal to the target period, to keep the compressor activated until pressure in the reservoir increases to an elevated target pressure higher than the base target pressure and to activate the purge valve to route air from the reservoir along the second flow path to purge the dryer of liquid.

2. The CTIS of claim 1, wherein the controller comprises:
an electronic processor having a first electrical input for receiving an electrical signal indicative of the value of the compressor activation period, a second electrical input for receiving an electrical signal indicative of the pressure in the reservoir, a first electronic output for controlling the compressor and a second electronic output for controlling the purge valve; and
an electronic memory device electrically coupled to the electronic processor and having instructions stored therein;
wherein the processor is configured to access the memory device and execute the instructions stored therein.

3. The CTIS of claim 1, wherein the compressor activation period is a time period for which the compressor has been active when the compressor operation is complete.

4. The CTIS of claim 1, wherein the compressor activation period is the sum of a time period for which the compressor has been active when the compressor operation is complete, and an estimated time period for which the compressor would be active to refill the reservoir to the base target pressure.

5. The CTIS of claim 1, wherein the base target pressure is between 7 bar(g) and 8 bar(g).

6. The CTIS of claim 1, wherein the elevated target pressure is between 8 bar(g) and 9 bar(g).

7. The CTIS of claim 1, wherein the controller is configured to activate the purge valve to route air along the second flow path until the pressure in the reservoir reaches a post-purge target pressure.

8. The CTIS of claim 7, wherein the post-purge target pressure is less than the base target pressure.

9. The CTIS of claim 8, wherein the post-purge target pressure is between 4 bar(g) and 6 bar(g).

10. The CTIS of claim 1, wherein the controller is configured to reset the compressor timer after purging the dryer if the compressor activation period is greater than or equal to the target period.

11. The CTIS of claim 1, wherein the purge valve is on the second flow path.

12. The CTIS of claim 1, comprising a reservoir valve disposed on the first flow path between the reservoir and the dryer.

13. The CTIS of claim 12, wherein the purge valve is on the second flow path and wherein the controller is configured to close the reservoir valve and open the purge valve after refilling the reservoir to the base target pressure, so as to vent pressure in the CTIS system through the dryer, if the compressor activation period is less than the target period.

14. The CTIS of claim 12 wherein the purge valve is on the second flow path and wherein the controller is configured to activate the purging system by opening the purge valve while the reservoir valve is open.

15. The CTIS of claim 1, wherein the compressor operation is the inflation of one or more tires or the refilling of the reservoir.

16. The CTIS of claim 1, wherein the target period is selected such that, in order to inflate four tires of the vehicle, the compressor must run for a time period that is greater than or equal to the target period.

17. The CTIS of claim 1, wherein the target period and/or the base target pressure and/or the elevated target pressure can be modified to suit operating conditions of the CTIS.

18. A method of purging a dryer in a central tire inflation system (CTIS) of a vehicle, the CTIS comprising a reservoir containing compressed air for supply to one or more vehicle tires, a compressor for supplying compressed air to the reservoir, a compressor timer for monitoring a run-time of the compressor, a dryer for drying air supplied by the compressor, and a controller for controlling at least the operation of the compressor, and the method, when executed by the controller of the CTIS, causes the controller to perform method steps comprising;

activating the compressor such that air flows into the reservoir to effect a compressor operation, after which operation air in the reservoir is at a post-operation pressure;

after the compressor operation is complete, determining a compressor activation period in dependence on a measurement by the compressor timer; and in the case that the compressor activation period is less than a target period, operating the compressor to refill the reservoir with air until pressure in the reservoir increases to a base target pressure higher than the post-operation pressure; and in the case that the compressor activation period is greater than or equal to a target period, operating the compressor to refill the reservoir with air until pressure in the reservoir reaches an elevated target pressure higher than the base target pressure, and routing air from the reservoir through the dryer to purge the dryer of liquid such that the pressure in the reservoir decreases from the elevated target pressure to a pressure lower than the elevated target pressure.

19. The method of claim 18, wherein the compressor activation period is a time period for which the compressor has been active when the compressor operation is complete.

20. The method of claim 18, wherein the compressor activation period is the sum of a time period for which the compressor has been active when the compressor operation is complete, and an estimated time period for which the compressor would be active to refill the reservoir to the base target pressure.

* * * * *